Jan. 21, 1958  J. A. CLAUSS, JR., ET AL  2,820,276
SPLIT BAND CLAMP
Filed Sept. 27, 1954  2 Sheets—Sheet 2
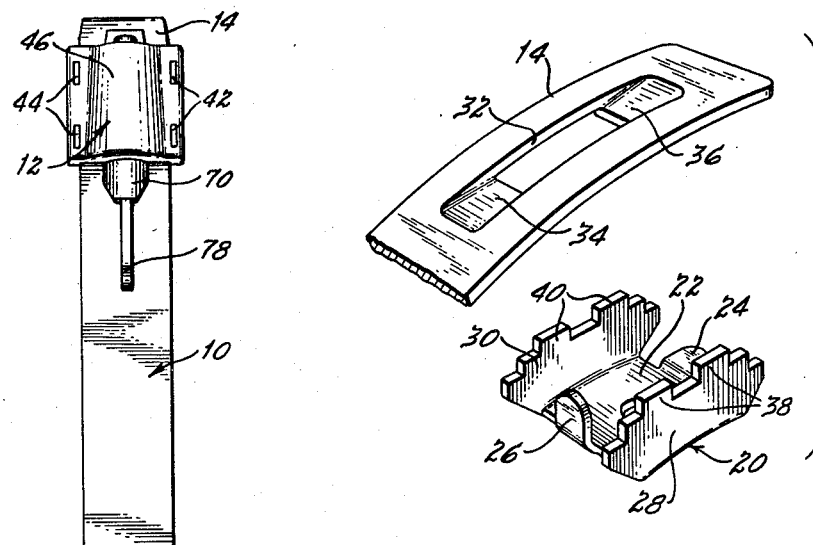
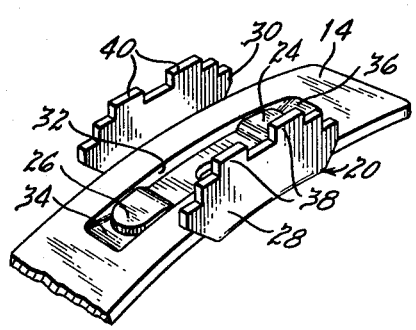
INVENTORS:
Julius A. Clauss, Jr.
BY William J. Chorkey
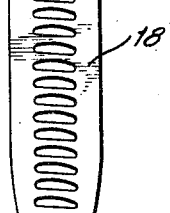
ATTORNEY.

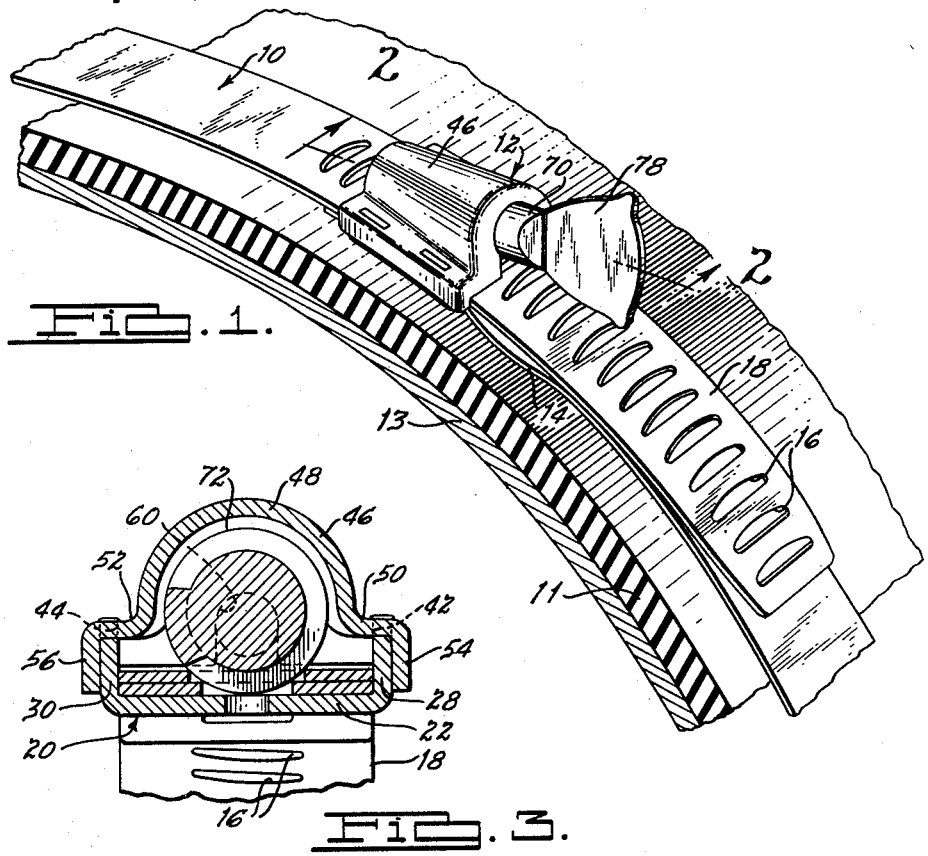
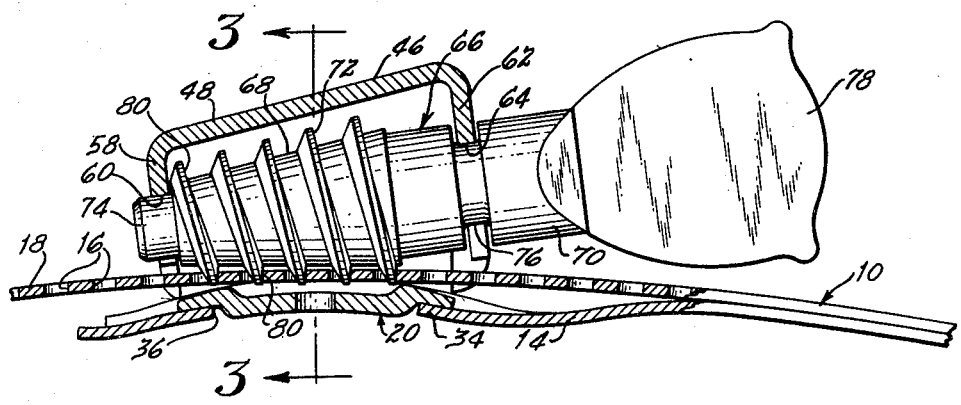
INVENTORS:
Julius A. Clauss, Jr.
William J. Chorkey
BY
ATTORNEY.

United States Patent Office 2,820,276
Patented Jan. 21, 1958

2,820,276

SPLIT BAND CLAMP

Julius A. Clauss, Jr., Southfield Township, Oakland County, and William J. Chorkey, Detroit, Mich., assignors to Jered Industries, Inc., Hazel Park, Mich., a corporation of Michigan Application September 27, 1954, Serial No. 458,538

2 Claims. (Cl. 24—274)

Our invention relates generally to a new and improved clamping mechanism and more particularly to an adjustable clamping mechanism of the split band type. Our invention is particularly useful in forming a fluid-tight connection between a flexible hose or the like and a pipe or other fluid conduit although it is also capable of a variety of other uses.

We are aware of various types of split band clamping devices that have heretofore been available in the related art. These devices normally comprise a flat, metallic band having regularly spaced openings or threads formed near one end thereof and having an adjusting mechanism secured to the other end. The band may be formed into a circular hoop which encircles the hose, the threaded end overlapping the other end. The adjusting mechanism is adapted to cause relative sliding movement between the two overlapped ends of the band thereby decreasing the diameter of the hoop and causing a uniform, radial clamping pressure to be exerted about the periphery of the hose. A substantially fluid-tight connection between the hose and an internally disposed pipe or other circular article may thereby be effected.

The adjusting mechanism for such split band clamping devices normally comprises a cage or housing which may be suitably connected to a saddle member. The saddle member is usually secured to the underside of the band near one end thereof. A threaded element is enclosed by the cage or housing and is rotatably journalled therein. The threads formed on the threaded element engage the openings or threads formed on the opposite end of the band and as the threaded element is rotated, the threaded end is drawn through the cage thereby varying the diameter of the hoop. The threaded element is usually adapted to be rotatably adjusted either manually or by means of a suitable hand tool.

The clamping devices of the type described above are commonly used for clamping hoses having a relatively small diameter but are unacceptable for clamping large diameter hoses for the reason that the clamping band interferes with the threaded element of the adjusting mechanism thereby making it difficult or impossible to obtain an adjustment. In addition, the clamping devices of the prior art may not be successfully used to clamp objects having a substantially flat outer surface since the clamping band will assume the shape of the outer surface of the object to be clamped and, if the adjusting mechanism for the clamping device is situated adjacent this flat outer surface, interference between the threaded element and the clamping band will occur.

We have successfully overcome these shortcomings by providing an improved clamping device having an adjusting mechanism of novel construction secured to one end of a split band wherein the adjusting mechanism comprises an improved adjustable element for bringing the split band into clamping engagement with the hose, said adjustable element including an integral, extended portion which may be readily gripped for the purpose of making manual clamping adjustments. The extended portion is positioned in a novel manner to prevent interference with the clamping band while the threaded element is rotatably adjusted.

The provision of a new and improved clamping device of the type described above being a principal object of our present invention, another object of our invention is to provide a clamping device which may be applied to hoses and other objects of various sizes including those having relatively large diameters and those having substantially flat outer surfaces.

Another object of our invention is to provide a clamping device of the type set forth in the preceding objects which is durable and relatively simple in construction, which is capable of applying a uniform clamping pressure, and which may be applied to a hose or other tubular object without removing the latter from the conduit or the like about which it is to be clamped.

Another object of our invention is to provide a clamping device which may be readily adjusted either manually or by means of a suitable hand tool without interference between the relatively adjustable elements thereof.

A further object of our instant invention is to provide a clamping device of the type previously set forth which is capable of exerting a relatively great clamping pressure without failure.

In carrying forth the foregoing objects, we have formed a clamping band of the type previously described with spaced threads at one end thereof. The two ends of the band are overlapped and a durable cage and saddle structure, the novel construction of which will hereinafter be particularly described, is secured to the unthreaded overlapped end. A tapered, conical, threaded element is disposed within the cage and is adapted to threadably engage the aforementioned threaded end. The central axis of the threaded element forms an acute angle with a tangent to the hooped clamping band drawn at the location of the engaging threads. A head portion is integrally formed on the tapered, threaded element and, according to the presently disclosed embodiment, it is provided with a wing-like flat to facilitate a manual adjustment of the same. By virtue of the novel, conical construction of the threaded element and of the cage within which it is housed, the wing-like flat is conveniently positioned and is free of interference with the band at all times.

For the purpose of more particularly describing the novel features of one embodiment of our instant invention, reference will be made to the accompanying drawings wherein:

Figure 1 is an assembly view showing a portion of the clamping device of our invention as it would appear when it is in clamping engagement with a flexible hose or the like;

Figure 2 is an enlarged sectional view of the clamping device of Figure 1 taken along the section line 2—2 of Figure 1, the flexible hose of Figure 1 being omitted;

Figure 3 is a sectional view taken along the section line 3—3 of Figure 2;

Figure 4 is an assembly view of the clamping device showing the clamping band in an extended position prior to assembly upon the hose;

Figure 5 is a detail view showing the saddle portion of the adjusting mechanism; and Figure 6 is a sub-assembly view showing the saddle portion of Figure 5 secured to one end of the clamping band.

Although we have disclosed one embodiment of our invention which is particularly adapted to be used in clamping circular hose, we contemplate that the clamping band of the clamping mechanism of our instant invention may also be applied to rectangular objects or to objects having a variety of other shapes. Further, the clamping mechanism of our instant invention is not restricted in use to an application of the type herein described. We contemplate that it may also be used to clamp objects other than fluid conduits or the like.

Referring first to Figures 1 and 4, the clamping mechanism of our instant invention includes a clamping band designated generally by numeral 10 and an adjusting mechanism designated generally by numeral 12, said adjusting mechanism being secured to an end portion 14 of the band 10. The other end portion of the band 10 is provided with spaced threaded openings 16 as shown, said other end portion being designated by numeral 18.

As best seen in Figure 1, the threaded end portion 18 of band 10 may be received through the adjusting mechanism 12 thereby overlapping the end portion 14. The band 10 thereby forms a hoop which may encircle a flexible hose 11 and clamp the same about a fluid conduit or the like shown at 13, the hose 11 and conduit 13 being shown in part in Figure 1.

Referring next to Figures 5 and 6, we have shown a saddle member 20 which forms a portion of the adjusting mechanism 12 referred to above. This saddle member comprises a base 22 which is provided with tabs 24 and 26 extending from two opposed sides thereof. Spaced, parallel side wall portions 28 and 30 are formed on the two other opposed sides of the band 10, the distance between the wall portions 28 and 30 being approximately equal to the width of the band 10.

The end portion 14 of the band 10 is provided with a longitudinal slot 32 having a width at least as large as the width of the tabs 24 and 26. The ends of the slot 32 are depressed, as shown, to provide a pair of abutments or anchor portions 34 and 36. The saddle 20 may be assembled to the band end portion 14 by bending at least one of the tabs 24 and 26 upwardly, as shown in Figure 5, and then inserting the tabs through the slot 32. The tabs may then be pressed or bent into the position shown in Figure 6 so as to retain the saddle 20 securely in place on the end portion 14, the anchor portions 34 and 36 being effective to prevent relative longitudinal movement of the saddle with respect to the band. Since the anchor portions are depressed as shown, the tabs 24 and 26 may be disposed substantially in the plane of the band end portion 14.

The upper edges of each of the side wall portions 28 and 30 of the saddle 20 are provided with projections shown at 38 and 40 respectively. These projections are adapted to be received within mating apertures 42 and 44 formed on a cage member 46 as best seen in Figure 3, said cage member forming a portion of the aforementioned band adjusting mechanism 12.

The cage member 46 comprises a conically shaped upper portion 48 and laterally extending flanges 50 and 52, the apertures 42 and 44 being formed in flanges 50 and 52 respectively. Side wall extensions 54 and 56 are formed on either side of the cage member 46, as shown, said side wall extensions being positioned adjacent the wall portions 28 and 30 of the saddle portion 20 thereby substantially enclosing the latter. The projections 38 and 40 formed on the side wall portions 28 and 30 may be peened over or otherwise upset to provide a rigid sub-assembly.

One longitudinal end of the cage member is provided with a closure wall 58 within which is formed an elongated slot 60, the end of slot 60 being formed with a radius as shown. The cage member 46 is enclosed at the other longitudinal end by a closure wall 62 which is similarly provided with an elongated slot 64. Sufficient space is allowed between the base 22 of the saddle portion 20 and the adjacent edge of the closure walls 58 and 62 to permit the end portion 18 of the band 10 to be received therethrough and to overlap the band end portion 14 as shown. The cage member 46, including the conical portion 48, the walls 58 and 62, the flanges 50 and 52 and the extensions 54 and 56, is preferably formed as an integral unit by a suitable stamping operation.

As best seen in Figure 2, a threaded element shown generally at 66 is enclosed by the cage member 46 and it comprises a conical portion 68 and a shank portion 70. The conical portion is entirely enclosed by the cage member 46 and is provided with threads 72 as shown, the pitch of the threads being equal to the pitch of the threads formed in the band end portion 18. A circular bearing portion 74 of reduced size is formed at the smaller end of the element 66 and is received in the slot 60 formed in the closure wall 58 of the cage member 46, the radius of the bearing portion 74 being substantially equal to the radius formed at the end of slot 60.

The shank portion 70 is preferably cylindrical in shape and is provided with a bearing groove 76. The shank portion 70 is adapted to extend externally of the cage member 46 through the closure wall 62, the groove 65 fitting within the elongated slot 64. The radius of the shank portion 70 at the base of the groove 76 is substantially equal to the radius formed at the rounded end of the slot 64.

A wing-like flat 78 may be formed at the end of the shank portion 70 as shown, to accommodate the manual rotation of the element 66 within the cage 46 although we contemplate that other forms of gripping means may also be provided. Further, the shank 70 may also be provided with a suitable opening on the end thereof to accommodate a suitable tool such as a screw driver, an Allen wrench, or some other common band instrument.

In assembling the clamping mechanism of our instant invention about a hose, the band end portion is trained between the spaced side wall portions 28 and 30 and through the opening provided at the base of the cage closure walls 58 and 62. The threads 72 are adapted to threadably engage the thread openings 16 in the band end portion 18 and as the element 66 is manually rotated, the end portion 18 is moved relative to the overlapped end portion 14.

The threads 72 are formed on one side thereof with flat edges 80 which are substantially perpendicular to the plane of the band end portion 18. The other side of the threads may be tapered as shown in Figure 2. The mating threads 16 in the band end portion 18 are formed with a large flat area on one side thereof for the purpose of contacting the flat edges 80 of the threads 72. This thread construction reduces the possibility of slipping between the element 66 and the band end portion 18 when the clamping pressure is increased to relatively high values. The forces which are exerted on the threads 72 while the element 66 is rotated are directed in a tangential direction by reason of the perpendicular flat edges 80 formed on the threads.

It is readily apparent from Figure 2 that the central axis of the threaded element forms an acute angle with respect to the plane of the band end portion 18 in the vicinity of the cage 46. The shank portion 70 and the gripping means 78 formed thereon are therefore positioned away from the band and interference between the gripping means 78 and the band is thereby avoided.

As the radius of curvature of the clamping band increases, this interference problem becomes increasingly important. However, the clamping means of our instant invention is effective to successfully overcome this difficulty regardless of the magnitude of the radius of curvature of the clamping band.

The number of threaded openings 16 may be varied as desired to accommodate hoses having a range of sizes and the inner surface of the saddle may be provided with a curvature which will best accommodate the curvature of hoses within this size range.

While we have specifically described one preferred embodiment of our invention, we contemplate that various changes and modifications may be made therein without departing from the spirit and scope thereof as defined by the appended claims.

We claim:

1. In a clamping band mechanism for use in applying a clamping force to a hollow flexible object of relatively large cross sectional dimensions, a metallic strap surrounding said flexible object, one end of said strap being threaded, a housing secured to the other end of said strap, said housing comprising a saddle portion disposed on the inner side of said strap and outwardly extending side portions positioned adjacent the edges of said strap, an outer housing portion attached to said side portions on the outer side of said strap, said outer housing portion being defined in part by two peripherally spaced walls, an opening formed in each wall at least equal in width to the width of said strap, the threaded end of said strap being received through said openings in overlapping relationship with respect to said other end, a screw member having a generally conical shape, said screw member being rotatably journalled in said walls and within said outer housing portion, external threads formed on said conical screw member, the portion of the threaded end of said strap within said housing being situated between said other strap end and said screw member in threaded engagement with the latter, the axis of said conical screw member forming an acute angle with tangent lines drawn through any point on said strap situated between the spaced walls of said outer housing member, and means for rotatably adjusting said screw member including an axial extension for accommodating a manual gripping of the same, the rotatable adjustment of said screw member being accompanied by a relative sliding movement of said strap ends within said housing and a clamping force on each strap end, the force applied to one strap end being substantially equal in magnitude and directly opposed to the force applied to the other strap end.

2. In a clamping band mechanism for use in applying a clamping force to a flexible circular sleeve having a relatively large diameter, a metallic strap surrounding said flexible sleeve, one end of said strap being threaded, a housing secured to the other end of said strap, said housing comprising a saddle portion disposed on the inner side of said strap and outwardly extending side portions positioned adjacent the edges of said strap, an outer housing portion attached to said side portions on the outer side of said strap, said outer housing portion being defined in part by two peripherally spaced walls, an opening formed in each wall at least equal in width to the width of said strap, the threaded end of said strap being received through said openings in overlapping relationship with respect to said other end, a screw member having a generally conical shape, said screw member being rotatably journalled in said walls and within said outer housing portion, external threads formed on said conical screw member, the maximum distance between the largest secant of the arc defined by that portion of the outer surface of said threaded strap end extending between said peripherally spaced walls and a point on the arc itself being substantially less than the height of said external threads, the portion of the threaded end of said strap within said housing being situated between said other strap end and said screw member in threaded engagement with the latter, the axis of said conical screw member forming an acute angle with tangent lines drawn through any point on said strap situated between the spaced walls of said outer housing member, and means for rotatably adjusting said screw member including an axial extension for accommodating a manual gripping of the same, the rotatable adjustment of said screw member being accompanied by a relative sliding movement of said strap ends within said housing and by a clamping force on each strap end, the force applied to one strap end being substantially equal in magnitude and directly opposed to the force applied to the other strap end.

References Cited in the file of this patent

UNITED STATES PATENTS

| | | |
|---|---|---|
| 2,395,273 | Hill et al. | Feb. 19, 1946 |
| 2,607,092 | Rubly | Aug. 19, 1952 |

FOREIGN PATENTS

| | | |
|---|---|---|
| 266,906 | Italy | Aug. 17, 1929 |
| 336,007 | France | Dec. 28, 1903 |

U. S. DEPARTMENT OF COMMERCE
PATENT OFFICE

CERTIFICATE OF CORRECTION

Patent No. 2,820,276   Julius A. Clauss, Jr., et al.    January 21, 1958

It is hereby certified that error appears in the printed specification of the above numbered patent requiring correction and that the said Letters Patent should read as corrected below.

Column 4, line 30, for "band" read -- hand --; column 5, line 28, and column 6, line 25, for "member", in each occurrence, read -- portion --.

Signed and sealed this 27th day of May 1958.

(SEAL)

Attest:
KARL H. AXLINE
Attesting Officer

ROBERT C. WATSON
Commissioner of Patents